(12) United States Patent
Birker

(10) Patent No.: US 11,691,209 B2
(45) Date of Patent: Jul. 4, 2023

(54) SAW TOOTH SETTER

(71) Applicant: Chris Birker, Oro-Medonte (CA)

(72) Inventor: Chris Birker, Oro-Medonte (CA)

( * ) Notice: Subject to any disclaimer, the term of this patent is extended or adjusted under 35 U.S.C. 154(b) by 0 days.

(21) Appl. No.: 17/743,979

(22) Filed: May 13, 2022

(65) Prior Publication Data

US 2023/0019407 A1     Jan. 19, 2023

(30) Foreign Application Priority Data

Jul. 9, 2021 (CA) .................... CA 3124208

(51) Int. Cl.
*B23D 63/02* (2006.01)
(52) U.S. Cl.
CPC .................... *B23D 63/02* (2013.01)
(58) Field of Classification Search
CPC ........................................... B23D 63/02
See application file for complete search history.

(56) References Cited

U.S. PATENT DOCUMENTS

| | | | | |
|---|---|---|---|---|
| 5,730,032 A * | 3/1998 | Kraft | ...................... | B23D 63/02 269/238 |
| 10,315,260 B2 * | 6/2019 | Belzile | ................. | B23D 63/201 |
| 2006/0086208 A1* | 4/2006 | Gschwind | .............. | B23D 63/02 76/58 |
| 2023/0019407 A1* | 1/2023 | Birker | ................... | B23D 63/02 |

FOREIGN PATENT DOCUMENTS

CA    2 634 090 A1 * 12/2009

OTHER PUBLICATIONS

Office Action dated Sep. 24, 2021, for priority Canadian Patent Application No. 3,124,208.
Notice of Allowance dated Nov. 11, 2021, for priority Canadian Patent Application No. 3,124,208.

* cited by examiner

*Primary Examiner* — Hwei-Siu C Payer
(74) *Attorney, Agent, or Firm* — Renner, Otto, Boisselle & Sklar, LLP

(57) ABSTRACT

A saw tooth setter has a carriage within a housing. A carriage base has a channel which narrows from a first end to a second end. A wedge protrudes up from the base in the channel. Mechanical linkage translates movement of an actuator into forward and backward movement of the carriage. A second mechanical linkage translates movement of the carriage to forward and backward movement of a blade feeding arrangement. A setting mechanism has a set of opposing plates which extend through and are hingedly attached to the top cover. The first end of each plate is seated in the channel. The second end of each plate has sets the tooth. Upon forward movement of the carriage the first end of the plates enter the first end of the channel and are separated by the wedge, and the second end of the plates come together to set the teeth.

19 Claims, 7 Drawing Sheets

SAW TOOTH SETTER

CROSS-REFERENCE TO RELATED APPLICATION

This application claims priority to and all benefit of Canadian Patent Application Serial No. 3124208, filed on Jul. 9, 2021, for SAW TOOTH SETTER, the entire disclosure of which is fully incorporated herein by reference.

FIELD OF THE INVENTION

The present invention generally relates to a saw blade tooth setter. More particularly, the present invention relates to a tooth setter with a single actuator that both advances the saw blade and sets the teeth in one action.

BACKGROUND OF THE INVENTION

Band saws are used for a broad range of cutting tasks from cutting rough lumber to cutting intricate and delicate shapes. A band saw blade is typically a continuous loop of flexible metal with cutting teeth on one edge. A non-continuous version of a band saw blade is shown in FIG. 7 for reference, in which various aspects of the blade are illustrated. The teeth of the band saw blade are typically displaced alternating to each side of the plane of the blade (See inset of FIG. 7). The displacement of each band saw tooth from the plane of the blade is known as the set of the tooth. This displacement provides clearance for the blade body to pass through the object being cut and aids in the removal of the waste material from the saw kerf. A number of patterns can be used to set saw blade teeth, but the most common is when pairs of successive teeth along the length of the band saw blade are set to opposing sides of the plane of the blade. The opposing off-set provides equal clearance and dynamic forces on each side of the blade as it passes through the cutline kerf in the material to be cut and aids the blade in tracking in a straight line through the cut. Sometime a raker tooth, which is not off-set, is left between pairs of off-set teeth. For example, in the inset of FIG. 7, the first and third teeth are off-set, whereas the middle raker tooth is left straight to facilitate cleaning out the cut.

A band saw blade with too much set on each cutting tooth removes more material than necessary, requires more power to drive, and will dull more quickly. A blade with too little set will bind and burn in the saw cut kerf. Over time and use, the saw blade teeth revert back a vertical position in line with the plane of the blade. In practice, it is desirable to routinely reset the amount of off-set of each cutting tooth along the blade.

To re-set the teeth of a saw blade, the blade is typically held in a fixed position and each tooth is displaced a given distance to one side or the other of the plane of the blade. The elasticity of the blade material results in each tooth springing back slightly from the full displaced position. Therefore, it is required that each tooth be displaced slightly more than the desired final set during the re-set operation. It is desirable to achieve a consistent and precise set on each tooth of the blade during the re-set operation despite the elastic properties of the blade material. In addition, resetting each tooth of a saw blade can be quite time consuming. Therefore, a mechanical advantage is also desirable to aid the operator, and preferably with as few steps as possible to accelerate the process.

Existing automatic tooth setters can set two teeth at a time, using two setters that operate independently. Existing tooth setters set one tooth at a time, to one side of the blade. The blade must then be reversed to set an equivalent number of teeth in the opposition side. A lever is used to advance the blade and a second lever is used to set the tooth.

Accordingly, there is a need for a tooth setter for quickly and reliably achieving a uniform set on each tooth of a saw blade, with fewer steps to minimize operator fatigue and shorten the length of time of the process.

SUMMARY OF THE INVENTION

According to an aspect of the present invention, there is provided a tooth setter for setting a tooth of a saw blade, the tooth setter comprising a housing comprising a top cover; a carriage within the housing comprising a base and upstanding sidewalls that define a channel, the channel narrowing in width from a first end to a second end, and a wedge protruding up from the base between the sidewalls in the first end of the channel, the carriage arranged for a forward movement and a backward movement wherein forward is movement in a direction from the first end to the second end and backward is movement in a direction from the second end to the first end; a first mechanical linkage configured to translate movement of an actuator into the forward movement and the backward movement of the carriage; a second mechanical linkage configured to translate the forward movement and the backward movement of the carriage to forward movement and backward movement of a blade feeding arrangement; and a setting mechanism, the setting mechanism comprising a set of opposing plates each comprising a first end and a second end, the set of plates extend through and are hingedly attached to the top cover, the first end of each plate is seated in the channel, and the second end of each plate comprising a setting finger extending outward from an inner face of a first plate toward an opposing second plate; whereby upon the forward movement of the carriage by the first mechanical linkage, the first end of the plates enter the first end of the channel and are separated by the wedge, and the second end of the plates come together into a setting position.

In one embodiment, the first mechanical linkage comprises the actuator; a crankshaft connected at a first end to the actuator; a drive wheel connected to a second end of the crankshaft; and a first link arm, a first end of the first link arm rotatably connected along a radius of the drive wheel, and the second end of the first link arm connected to the carriage.

In another embodiment, the second mechanical linkage comprises a second link arm, a first end of the second link arm has a connection to the carriage; and a feed lever, a first end of the feed lever connected to the second end of the second link arm, the feed lever extending through and hingedly attached to the top cover; whereby movement of the second link arm in one direction moves the second end of the feed lever in the opposing direction.

In an embodiment, the connection between the second link arm and the carriage comprises a pin from the carriage seated in a longitudinal recess in the first end of the second link arm. This connection causes a delay between movement of the carriage and movement of the second link arm.

In a further embodiment, the blade feeding arrangement comprises a feed finger, a first end of the feed finger rotatably attached to the second end of the feed lever, the second end of the feed finger is biased downward toward the top cover to engage with teeth of the saw blade.

In yet another embodiment, the feed finger comprises adjustment means to adjust a length of the feed finger.

In an embodiment, the second end of each plate comprises: a setting finger extending outward from an inner face of the plate toward the opposing plate; and a recess in the inner face of the plate, adjacent the setting finger. The plates are arranged such that the setting finger from a first plate opposes the recess of a second plate creating a first setting position, and the setting finger of the second plate opposes the recess of the first plate creating a second setting position.

In another embodiment, at least one plate comprises a finger adjuster to adjust the distance the setting finger extends outward from the inner face of the plate. At least one plate may also comprises a sensor arranged in the recess that detects the setting of the tooth. Also, at least one plate comprises a bend plate immediately below the recess. The bend plate serves to support the base of the tooth and/or the saw while the tip of the tooth is being set.

In a further embodiment, the blade feeding arrangement comprises: a feed finger, a first end of the feed finger rotatably attached to the second end of the feed lever, the second end of the feed finger is biased downward toward the top cover to engage with teeth of the saw blade.

In a further embodiment, the feed finger comprises adjustment means to adjust a length of the feed finger. In a further embodiment, the second end of each plate further comprises: a recess in the inner face of the plate, adjacent the setting finger; wherein the plates are arranged such that the setting finger from a first plate opposes the recess of a second plate creating a first setting position, and the setting finger of the second plate opposes the recess of the first plate creating a second setting position.

In a further embodiment, the at least one plate comprises a finger adjuster to adjust a distance the setting finger extends outward from the inner face of the plate. In a further embodiment, the at least one plate further comprises a sensor arranged in the recess that detects the setting of the tooth. In a further embodiment, the at least one plate comprises a bend plate immediately below the recess.

In a further embodiment, the first end of each plate comprises a follower, the follower being seated in the channel.

In a further embodiment, there are guides on the top cover that define a space therebetween to receive the blade, the guides are arranged on the top cover to direct the blade to a space between the opposing plates. In a further embodiment, the carriage is slidably mounted on rails. In a further embodiment, one end of the rails are secured to a support or to the housing, and a second end of each rail has a stop.

In a further embodiment, both plates comprise a finger adjuster to adjust the distance the setting finger extends outward from the inner face of the plate. In a further embodiment, both plates comprise a sensor arranged in the recess that detects the setting of the tooth. In a further embodiment, both plates comprise a bend plate immediately below the recess.

In a further embodiment, the actuator is a manually operated lever. In a further embodiment, the actuator is driven by motor.

BRIEF DESCRIPTION OF THE DRAWINGS

Reference will now be made, by way of example, to the accompanying drawings which show exemplary embodiments of the present application, and in which.

DETAILED DESCRIPTION OF EXEMPLARY EMBODIMENTS

Figure 1:
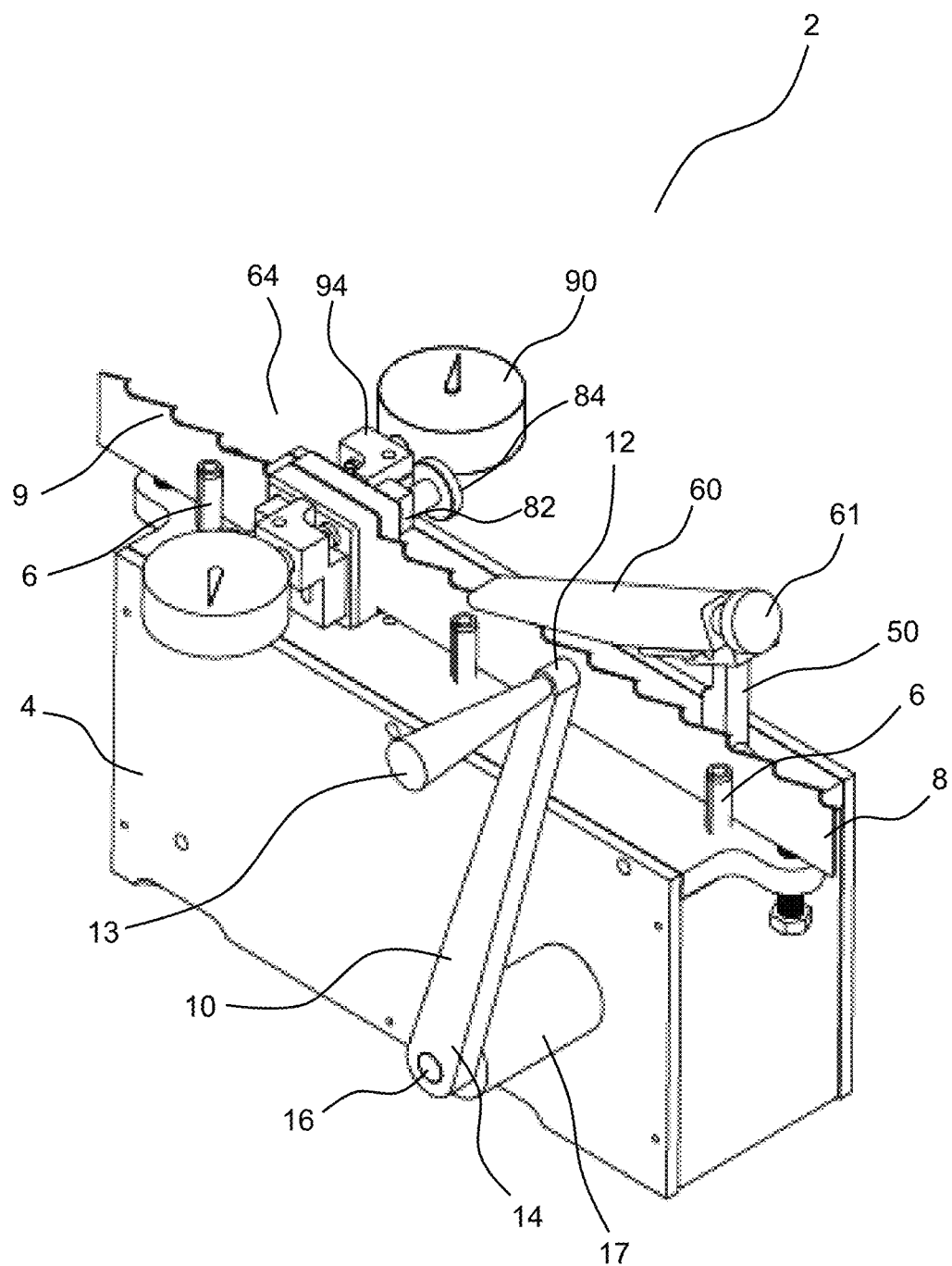
FIG. 1 shows a perspective view of a tooth setter, including a portion of a sawblade, according to an embodiment of the invention.

The features and benefits of the present disclosure are illustrated and described herein by reference to exemplary embodiments and is in no way intended to limit the invention, its application, or uses. This description of exemplary embodiments is intended to be read in connection with the accompanying drawings, which are to be considered part of the entire written description. Accordingly, the present disclosure expressly should not be limited to such embodiments, and features of each embodiment described herein may be combined with each other to form further embodiments.

In the description of embodiments disclosed herein, any reference to direction or orientation is merely intended for convenience of description and is not intended in any way to limit the scope of the present invention. Relative terms such as "inner", "vertical", "forward", "backward", "downward", "outward", "top", "bottom", "end", "lower", "upper", "middle", and derivatives thereof, or any other terms related to direction or orientation should be construed to refer to the orientation as then described or as shown in the drawing(s) under discussion. These relative terms are for convenience of description only and do not require that the invention be constructed or operated in a particular orientation.

The tooth setter of the present invention utilizes a single actuator to both advance the saw blade and set the teeth in one action. The saw setting aspect is especially simplified and efficient by use of mechanical linkages through which force is transmitted.

Figure 2:
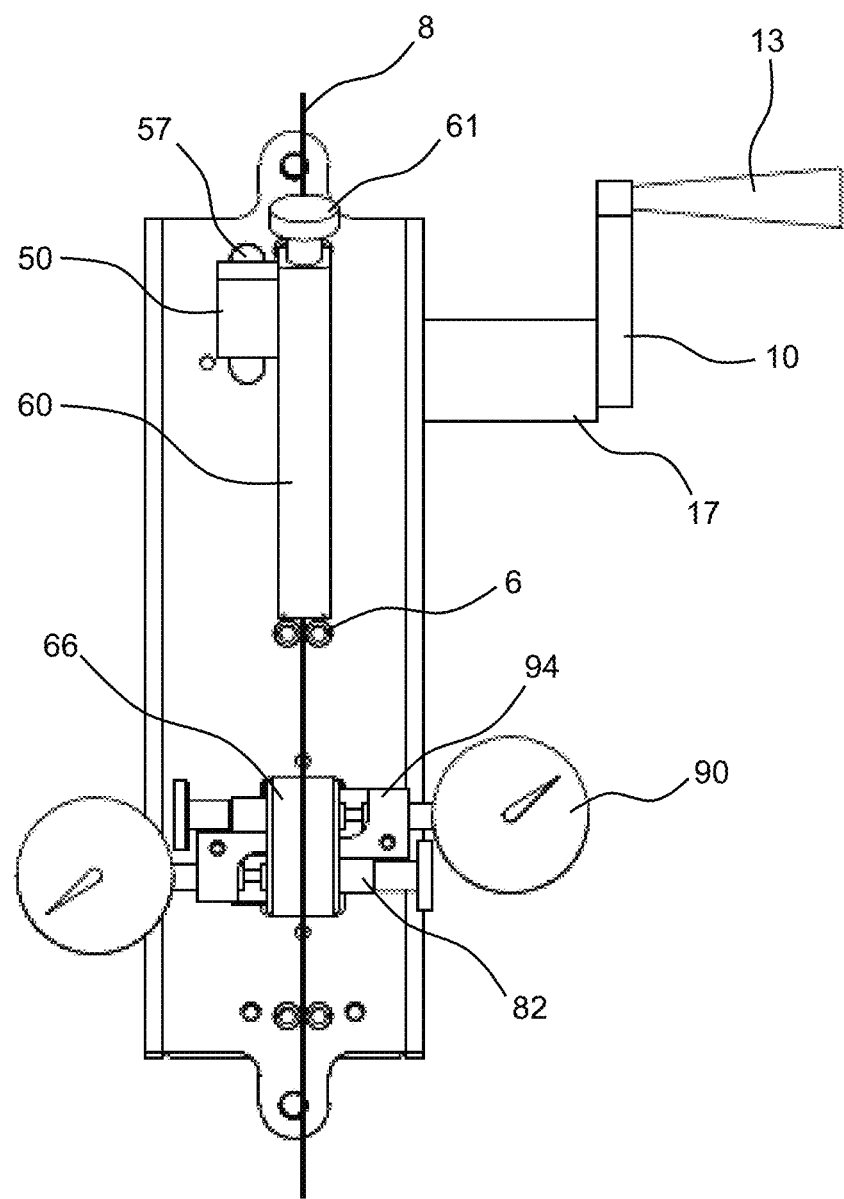
FIG. 2 shows a top plan view of the tooth setter of FIG. 1.

The tooth setter 2 according to one embodiment is shown in FIGS. 1 and 2. The tooth setter 2 preferably comprises a housing 4 that encases the inner mechanisms. The housing 4 can be generally a unitary piece, however, it is preferred that one or more of the sides of the housing 4 is removable to provide access to the mechanisms within the housing 4. For example, the pieces of the housing 4 can be connected together with fasteners, which would allow for certain pieces of the housing 4 to be removed, if necessary.

On top of the housing 4 is a series of guides 6 that serve to align a saw blade 8 on its intended path toward the setting mechanism 64. Although not visible in FIG. 1, a corresponding guide 6 can be found on the other side of the blade 8 adjacent the illustrated guide 6. The spacing between opposing guides is sufficient to receive a saw blade 8, while providing sufficient room to allow forward and backward movement of the blade 8. Although the guides 6 are shown as adjacent pairs, the guide 6 on one side of the blade may be offset in relation to the guide 6 on the opposing side. In a further embodiment, one or more of the guides 6 may be laterally adjustable, which would allow the tooth setter 2 to better accommodate blades 8 of different thicknesses.

The tooth setter 2 includes a first mechanical linkage. The first mechanical linkage is purposed to translate rotational or cranking movement of an actuator. The actuator may be motorized, for example, electrical or battery operated. The actuator may be manual, such as a rotating lever. In one embodiment shown, the actuator is a lever 10, and movement of the lever 10 is translated into forward and backward movement of a carriage 26. One embodiment of the first mechanical linkage is discussed below.

On a side of the housing 4 is an actuating lever 10 having a free end 12 that is manipulated by the user to actuate the tooth setter 2, and an opposing end 14. In an embodiment, a handle 13 is attached to the free end 12 to facilitate manipulation of the lever 10. The opposing end 14 of the lever 10 is connected to a crankshaft 16 that extends through the housing 4. Optionally, the crankshaft 16 can be shielded by a cover 17.

Figure 3A:
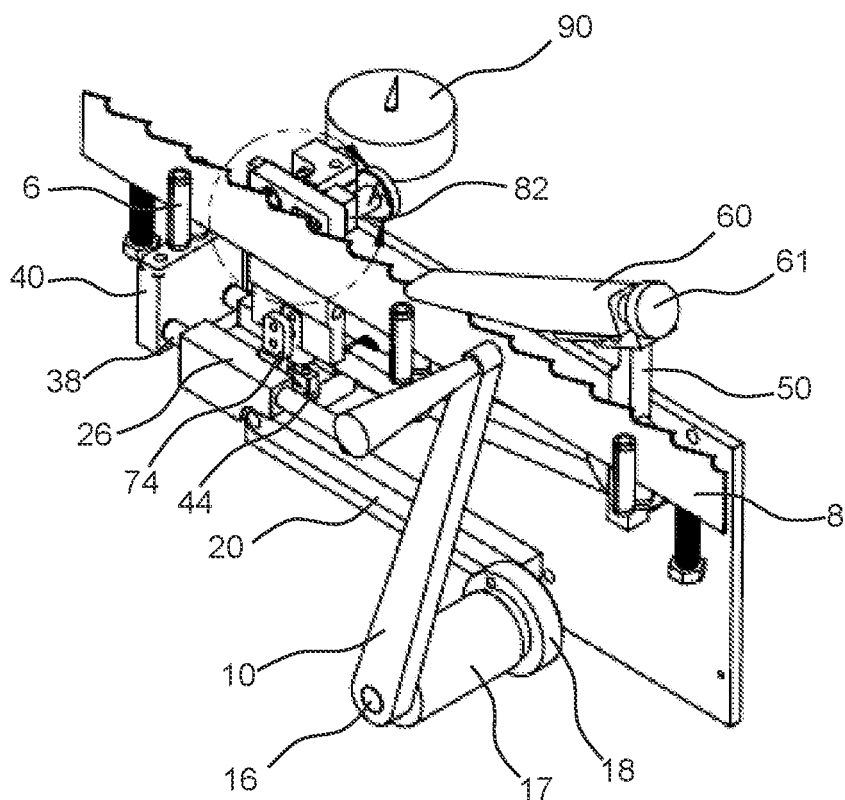
FIG. 3A shows a perspective view of the tooth setter in FIG. 1, in which a portion of the outer housing and one of the plates has been removed for clarity.

As can be seen in FIG. 3A, in which a portion of the housing 4 is removed for clarity, the crankshaft 16 connects to and effectively serves as an axle for a drive wheel 18. Rotational movement of the actuating lever 10 results in rotation of the crankshaft 16, thereby also rotating the drive wheel 18.

Figure 4:
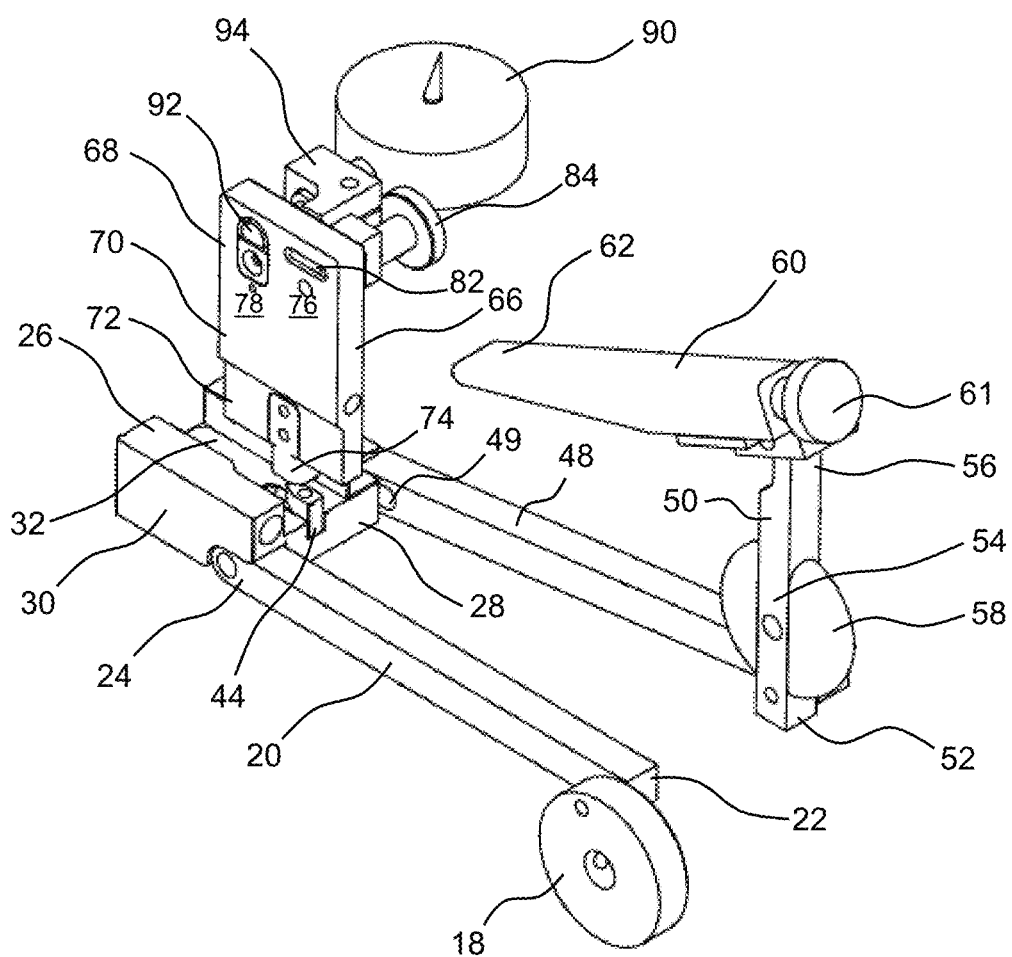
FIG. 4 shows a perspective view of the internal mechanism of the tooth setter of FIG. 1, in which some parts including the housing have been removed for clarity.

As shown in FIG. 4, inside the housing, a first end 22 of a link arm 20 is connected, preferably rotatably attached, to the opposing side of the drive wheel 18, i.e. the side of the drive wheel 18 that is not connected to the crankshaft 16. The attachment point of the link arm 20 is not at the center of the drive wheel 18, but is located outward toward the perimeter of the drive wheel 18, i.e. along the radius of the drive wheel 18. This type of connection allows for the link arm 20 to be advanced or retracted along the length of the tooth setter 2 in response to the rotational movement of the drive wheel 18, which is controlled by the actuating lever 10. While the drive wheel 18 is illustrated as a circle in the Figures, it may take on other shapes, such as an oval, that allow similar translation of rotational movement of the actuating lever 10 into forward and backward movement of the link arm 20.

The link arm 20 extends longitudinally along the length of the tooth setter 2 within the housing 4. As can be seen in FIG. 4, in which all of the housing 4 has been removed for clarity, the opposing second end 24 of the link arm 20 is connected, preferably hingedly attached, to a carriage 26 near the far end of the tooth setter.

Figure 5A:
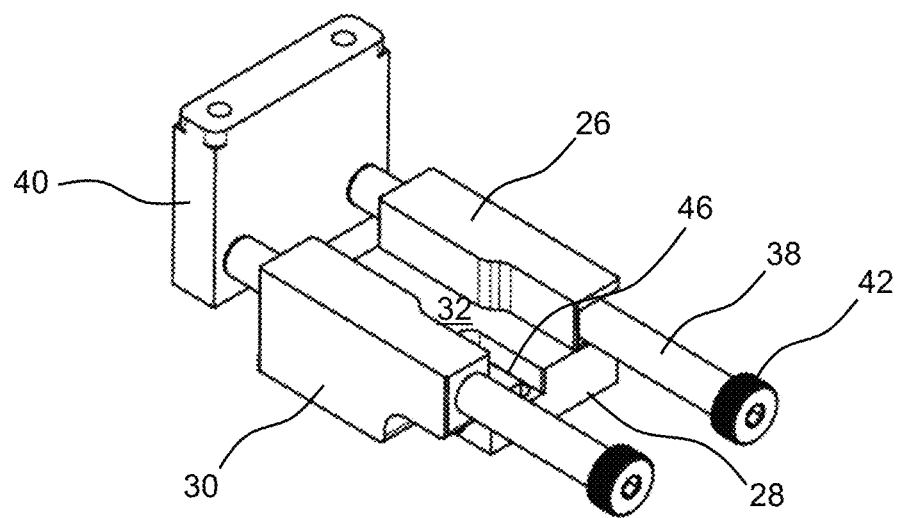
FIG. 5A shows a perspective view of the carriage apparatus.
Figure 5B:
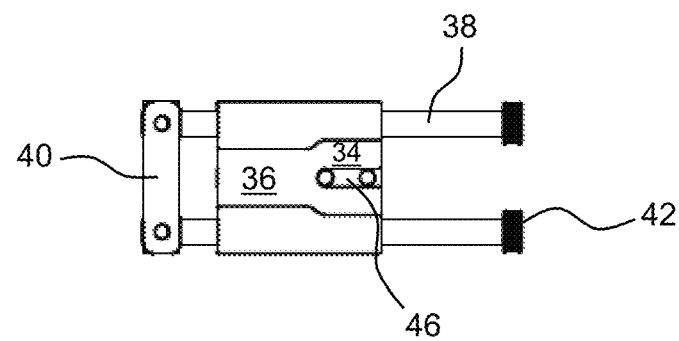
FIG. 5B shows a top view of the carriage apparatus of FIG. 5A.
Figure 5C:
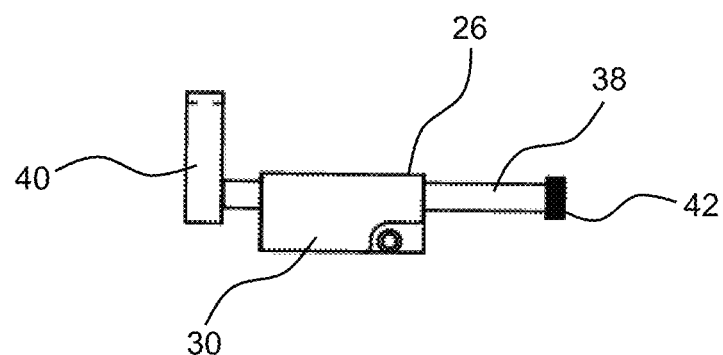
FIG. 5C shows a side view of the carriage apparatus of FIG. 5A.

The carriage 26 itself is shown in more detail in FIGS. 5A-5C. The carriage 26 has a base 28 with upwardly extending sidewalls 30 that define a channel 32 therebetween. The width of the channel 32 tapers gradually or abruptly, resulting in a first end 34 that has a greater width than the second end 36. Although the link arm 20 is illustrated as connecting to the carriage at a lower corner between the base 28 and a sidewall 30, this connection point may occur at any point of the carriage 26 provided the link arm 20 is able to transfer enough force to move the carriage 26 forward and backward.

The carriage 26 is arranged to move forward and backward in response to the forward and backward movement of the link arm 20. In the embodiment shown in the Figures, the carriage 26 is slidably mounted on rails 38 to facilitate this movement. In the illustrated embodiment, the rails 38 extend through the sidewalls 30 of the carriage 26 to permit the sliding movement, however, other means to mount the carriage 26 on the rails 38 are contemplated, such as mounting the carriage 26 on top of the rails 38, or hanging the carriage 26 underneath the rails 38.

As can be seen in FIG. 5A, the rails 38 are stabilized by attaching one end thereof to a support 40. The support 40 can be independent of the housing 4, in which case the support 40 is secured to one or more of the top, sides, or endwall of the housing 4, such as with fasteners or welding. Alternatively, the housing 4 itself may serve as the support 40, in which one end of the rails 38 are attached directly to the housing 4. Preferably the opposing ends of the rails 38 are outfitted with stops 42 to prevent the carriage 26 from sliding off the rails 38.

Extending upward from the base 28 at the first end 34 of the channel 32 is a wedge 44 (See e.g. FIG. 4). The wedge 44 is situated in the channel 32 substantially equidistant from the sidewalls 30, with the tapered portion of the wedge 44 effectively pointing longitudinally down the length of the channel 32 toward the second end 36. The wedge 44 may be integrally formed with the base 28. Alternatively, there may be a recess 46 in the base 28 that is shaped and dimensioned to receive and secure the wedge 44. In this embodiment, the wedge 44 can be secured through a snug press fit, or preferably the wedge 44 is secured in the recess 46 by way of at least one fastener, such as screws or bolts. In this manner, the wedge 44 can be replaced if necessary.

A second mechanical linkage connects the carriage 26 to a blade feeding arrangement. An embodiment of the second mechanical linkage is shown in FIG. 4, in which a second link arm 48 is connected, preferably hingedly attached, to the carriage 26. Preferably the second link arm 48 is connected to the side opposing the side of the carriage 26 to which the first link arm 20 is connected. With this linkage, as the drive wheel 18 rotates in response to the rotation of the actuating lever 10 and moves the link arm 20 forward, the carriage 26 also moves forward, which brings the second link arm 48 with it. Conversely, as the rotation of the drive wheel 18 pulls the link arm 20 and carriage 26 backward, the second link arm 48 moves backward as well.

In one embodiment that can be seen in FIG. 4, the connection between the second link arm 48 and the carriage 26 is not direct. Rather, in this embodiment a pin or other type or protuberance (not shown) extends from the carriage 26 and is seated in a void 49 or recess that extends within a portion of the second link arm 48. The void 49 preferably has an oblong shape, such as an oval or a rectangle. This type of connection provides a delay in movement of the second link arm 48 in response to the movement of the carriage 26.

The second link arm 48 extends back along the length of the tooth setter 2 within the housing 4, and the opposing end of the second link arm 48 is hingedly attached at or near a first end 52 of a feed lever 50. The feed lever 50 extends upward through a slot 57 (FIG. 2) in the top side of the housing 4, with a middle portion 54 of the feed lever 50 being hingedly connected transversely to the top side of the housing 4. With this linkage, forward movement of the second link arm 48 pulls the first end of the second link arm 48, thereby causing a backward movement of a second end 56 of the feed lever 50, and vice versa.

The slot 57 in the housing 4 must be of a sufficient length to permit forward and backward movement of the feed lever 50 as it hinges about the housing 4. With the required length of the slot 57, there is the opportunity for debris and material to enter the interior of the housing 4. In order to at least partially occlude the slot 57, it is preferred that a filling member 58 is attached to or forms part of the feed lever 50 substantially at the point where the feed lever 50 passes through the slot 57. FIG. 4 illustrates the filling member taking the shape of a disk, although other shapes are contemplated.

A feed finger 60 is connected, preferably hingedly attached, at or near the second end 56 of the feed lever 50. The feed finger 60 may be directly connected to the feed lever 50, however, an intermediate connecting piece may also be used. The feed finger 60 acts as a type of pawl with respect to the teeth of the saw blade 8. As can be seen in FIG. 1, the weight of the feed finger 60 biases the free end 62 of the feed finger 60 down toward the housing 4. When a saw blade 8 is properly mounted through the guides of the tooth setter 2, the free end 62 drops down into a gullet between two saw teeth 9. Preferably, the feed finger 60 is equipped with an adjusting device 61, such as a screw rotation adjuster, that allows for fine adjustments of the position of the feed finger 60 in relation to the feed lever 50. Such adjustments may be necessary to ensure a proper communication between the free end 62 of the feed finger 60 and the teeth 9 of the sawblade 8, or to adjust the feed finger 60 to different sawblades 8 that have different pitches.

With the above-described mechanical linkages, when the actuating lever 10 is rotated and ultimately causes the second link arm 48 to move backward, this causes the second end 56 of the feed lever 50 and the feed finger 60 to move forward. This forward movement causes the free end 62 to push on the saw tooth 9, thereby advancing the saw blade 8 forward toward the setting mechanism 64. As the feed finger 60 is retracted in response to further rotation of the actuating lever 10, the feed finger 60 slides over the back of the teeth 9 until it returns to a new gullet, typically two teeth 9 removed from its previous position on the blade 8.

Figure 7:
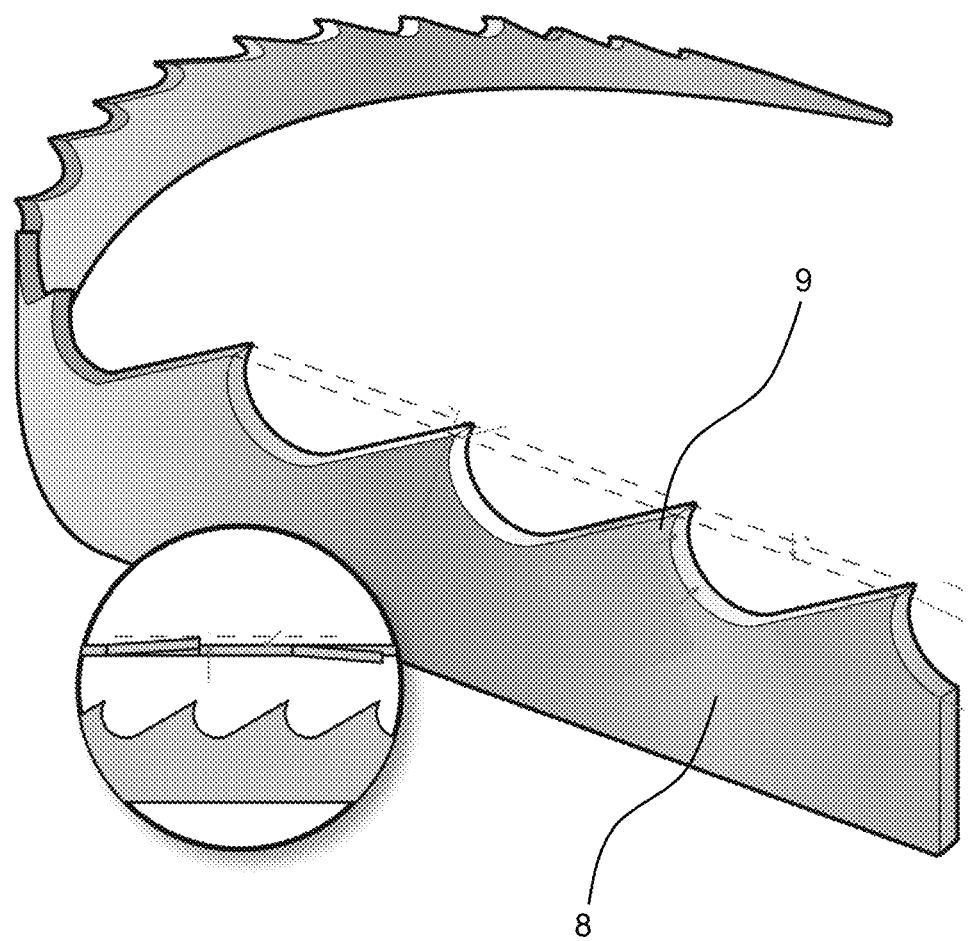
FIG. 7 shows an exemplary sawblade that can be used by the tooth setter.

In the embodiment shown in the Figures, the setting mechanism 64 is able to set two consecutive teeth 9 at a time. Accordingly, in this embodiment, the components of the tooth setter 2 are shaped and dimensioned for the feed finger 60 to advance the saw blade 8 a distance approximately equivalent to the length of two teeth 9 on the saw blade 8. Alternatively, if the end user intends to include a raker tooth, (see inset of FIG. 7), the feed finger 60 can be arranged to advance the saw blade 8 a distance approximately equivalent to the length of three teeth 9 on the saw blade 8. With three teeth 9 advancing in an embodiment in which the setting mechanism 64 only accommodates two teeth 9, every third tooth 9 will not be offset. If more raker teeth 9 are desired between offset teeth 9, further adjustments can be made to advance the blade 8 a desired distance. In addition, while not all blades 8 will have the same pitch, if necessary, the adjusting device 61 can be used to adjust the relative length of the feed finger 60 to compensate for blades 8 having different pitches.

The setting mechanism 64 is shown generally in FIG. 1, and in more detail in FIGS. 3A, 3B, 4, 5B and 6. The setting mechanism 64 comprises two opposing plates 66. Only one plate 66 is shown for visual clarity of function. Each plate has an upper portion 68, a middle portion 70, and a lower portion 72. The opposing plates 66 pass through a slot in the top side of the housing 4, with the sides of the middle portion 70 of each plate hingedly attached in the longitudinal direction to the housing 4, such as with hinge pins. The hinged movement allows the plates 66 to move from a setting position, in which the upper portion 68 of the plates 66 come together and the lower portion 72 of the plates 66 are separated, and a non-setting position, in which the upper portion 68 of the plates 66 are apart and the lower portion 72 of the plates 66 come together. The space between the plates 66 defines the tooth setting area, which is substantially in line with the guides 6 to receive the saw blade 8.

The lower portion 72 of the plates 66 extend down into the channel 32 of the carriage 26. When the setting mechanism 64 is in the non-setting position, the lower portion 72 of the plates are in the second end 36 of the channel 32. The width of the second end 36 of the channel 32 is dimensioned such that the lower portion 72 of the plates 66 are brought together, thereby separating the upper portion 68 of the plates 66.

As the actuating lever 10 is rotated, the carriage 26 is shifted forward. With the position of the plates 66 being fixed, the lower portion 72 of the plates 66 are forced to transition into the first end 34 of the channel 32, which has a larger width. In addition, as the carriage 26 continues to shift forward, the wedge 44 contacts the interface of the sandwiched lower portion 72 of the plates 66, thereby forcing separation of the lower portion 72 so that they move outward toward the sidewalls 30 of the carriage 26. This forced separation of the lower portion 72 of the plates 66 causes the plates 66 to rotate about their hinge points, and the upper portions 68 of the plates 66 come together in the setting position.

Figure 6:
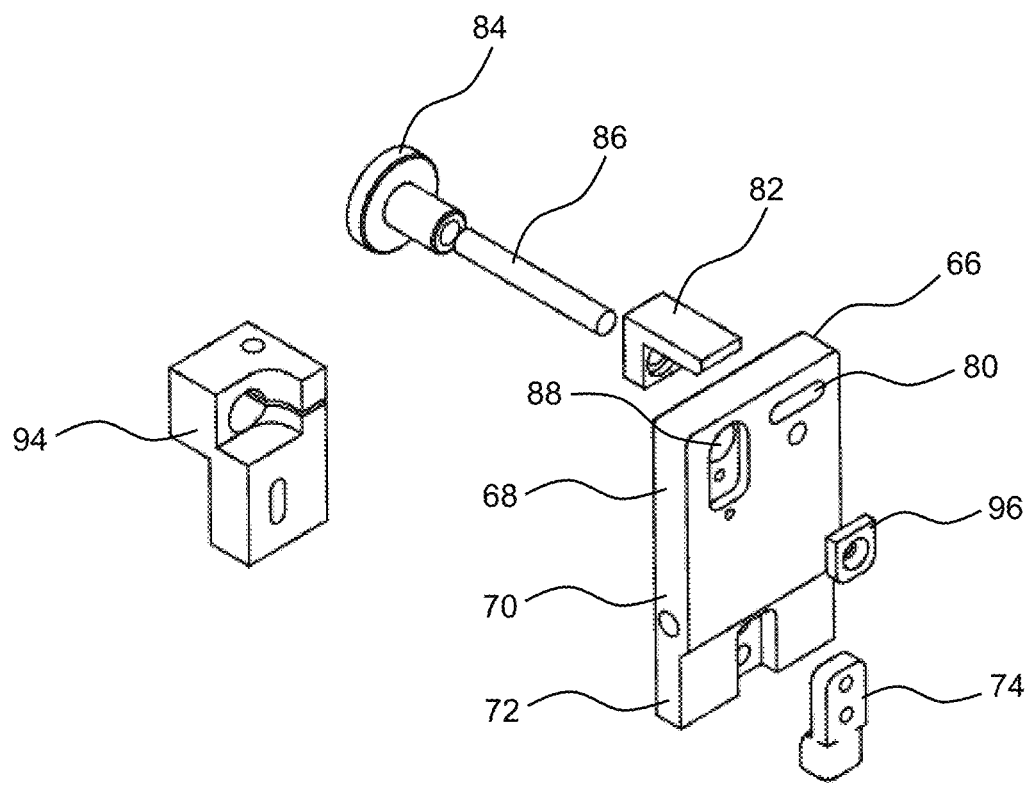
FIG. 6 shows an exploded view of a plate of the setting mechanism.

In another embodiment, at the end of the lower portion 72 of the plates 66 there is a follower 74 that extends further downward (See e.g. FIG. 6). In this embodiment, it is the follower 74 of each plate that resides in the channel 32, and is ultimately separated by the wedge 44, instead of the lower portion 72 of the plates 66 themselves. The follower 74 can be integral with each of the plates 66, or may be removably attached, such as with fasteners, to permit replacement thereof in the case of excessive wear. The cross section of the follower 74 can be square or rectangular, but may also have a round shape, such as circle or oval, as the radiused edges may facilitate movement of the follower 74 within the channel 32 and/or separation by the wedge 44.

The upper portion 68 of the plates is responsible for setting the teeth 9 of the saw blade 8, and can be seen in FIGS. 1, 3A, 3B, 4, and 6. The area between the two opposing plates 66 is dimensioned to receive two successive teeth 9 of the sawblade 8. One tooth 9 will be in a first setting position 76 while the adjacent tooth 9 will be in the second setting position 78 (FIG. 4).

As best seen in FIG. 6, each plate 66 comprises a setting slot 80 through which a setting finger 82 extends through. The depth of how far the setting finger 82 extends through the slot 80 can be adjusted with a finger adjuster 84, which can be e.g. a nut that can be tightened along a threaded member 86 to advance the setting finger 82 through the slot 80.

Figure 3B:
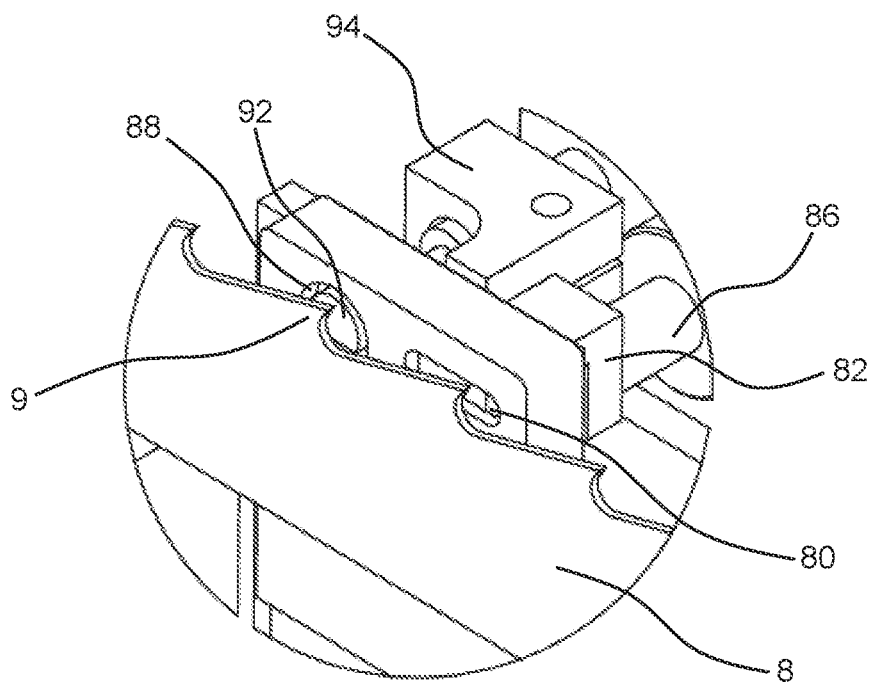
FIG. 3B shows an enlarged fragmentary view of the dashed circle shown in FIG. 3A.

As best seen in FIGS. 3A and 3B, adjacent the setting slot 80 is an aperture 88 that receives the sensing end 92 of a sensor 90. The sensing end 92 yields and retracts back toward the sensor 90 when pressure is applied. The sensor 90 may detect various parameters, such as how much force is exerted to set the tooth 9 of the sawblade 8, or the distance that the tooth 9 has been set relative to the inner face of the plate 66. This allows the user to monitor the setting of each tooth 9, and observe that each tooth 9 is being set consistently. A mount 94 may be used to secure the sensor 90 to the plate 66.

Preferably the aperture 88 is in an area that is recessed from the inner face of the plate 66. This recessed area provides a place for the tooth 9 to go as it is being set by the opposing setting finger 82. In one embodiment as shown in FIG. 6, situated just below the aperture 88 is a bend plate 96. The bend plate 96 is preferably flush with the inner face of the plate 66, and the top of the bend plate 96 forms a ledge that leads into the recess. Preferably, the bend plate 96 is made of a hard material that supports the blade 8 as the tooth 9 is bent over top of it into the recess. The bend plate 96 can be permanently affixed to the plate 66, or may be releasably attached.

As shown in FIG. 2, the opposing second plate 66 has the same design as the first plate 66, however, as the second plate 66 has been rotated 180°, thereby placing the setting finger 82 and the sensor 90 in reverse order. This produces a first setting position 76 having a setting finger 82 on one side of each tooth 9, and a sensor 90 and sensing end 92 on the other side of each tooth 9.

After the teeth 9 have been advanced into the tooth setting area via the feed finger 60, and two successive teeth 9 are aligned in the first and second setting positions 76, 78, the user continues to crank the actuating lever 10. This advances the carriage 26 and wedge 44 (FIG. 4), which forces separation of the lower portion 72 of the followers 74 out toward the sidewalls of the first end 34 of the channel 32 (FIG. 5A, 5B). As the lower portion 72 of the plates 66 are forced apart, the upper portion 68 of the plates 66 come together, which causes the setting fingers 82 to press against the respective teeth 9 and push them into the sensing end 92 of the opposing sensors 90 (FIG. 4). The applied force or distance displaced is registered on the sensors 90. After the teeth have been set, the user continues cranking the actuating lever 10, which retracts the carriage 26, forcing the lower portion 72 of the plates 66 or the followers 74 into the second end 36 of the channel 32, which opens up the upper portion 68 of the plates 66. Following this, the feed finger 60 advances the sawblade 12 until the next two teeth 9 are aligned in the first and second setting positions 76, 78. In one embodiment described above in which there is a void 49 in the second link arm 48 which provides a delay in the movement of second link arm 48 in the cycle. The linkage delay that is provided allows for the plates 66 to separate before the feed finger 60 advances the sawblade.

In one embodiment, the tooth setter 2 can be arranged with appropriate apertures and/or fasteners to allow for the tooth setter 2 to be mounted on a structure, such as a bench. Alternatively, the tooth setter 2 can have a series of legs or other supports that extend downward, or means to attach to a series of legs or other supports, in order to raise the tooth setter 2 to a height that is convenient for the user.

Although the tooth setter 2 has been described herein with two distinct setting positions that allow for the setting of two teeth 9 at a time, it is to be appreciated that plates 66 can be enlarged providing for a plurality of setting positions that can set more than two teeth 9 at a time.

What is claimed is:

1. A tooth setter for setting a tooth of a saw blade, the tooth setter comprising:
    a housing comprising a top cover;
    a carriage within the housing and comprising a base and upstanding sidewalls that define a channel, the channel narrowing in width from a first end to a second end thereof, and a wedge protruding up from the base between the sidewalls in the first end of the channel, the carriage arranged for a forward movement and a backward movement wherein forward is movement in a direction from the first end to the second end and backward is movement in a direction from the second end to the first end;
    a first mechanical linkage configured to translate movement of an actuator into the forward movement and the backward movement of the carriage;
    a second mechanical linkage configured to translate the forward movement and the backward movement of the carriage to a forward movement and a backward movement of a blade feeding arrangement; and
    a setting mechanism, the setting mechanism comprising a first plate and an opposing second plate, each plate comprising a first end and a second end, the first plate and the second plate extend through and are hingedly attached to the top cover, the first end of each plate is seated in the channel, and the second end of each plate comprising a setting finger extending outward from an inner face of the first plate toward the opposing second plate;
    whereby upon the forward movement of the carriage by the first mechanical linkage, the first end of the plates enter the first end of the channel and are separated by the wedge, and the second end of the plates come together into a setting position.

2. The tooth setter of claim 1, wherein the first mechanical linkage comprises:
    the actuator;
    a crankshaft connected at a first end thereof to the actuator;
    a drive wheel connected to a second end of the crankshaft; and
    a first link arm, a first end of the first link arm rotatably connected along a radius of the drive wheel, and a second end of the first link arm connected to the carriage.

3. The tooth setter of claim 1, wherein the second mechanical linkage comprises:
    a second link arm, a first end of the second link arm has a connection to the carriage; and
    a feed lever, a first end of the feed lever connected to a second end of the second link arm, the feed lever extending through and hingedly attached to the top cover;
    whereby movement of the second link arm in one direction moves a second end of the feed lever in an opposing direction.

4. The tooth setter of claim 3, wherein the connection between the second link arm and the carriage comprises a pin from the carriage seated in a longitudinal recess in the first end of the second link arm.

5. The tooth setter of claim 3, wherein the blade feeding arrangement comprises:
    a feed finger, a first end of the feed finger rotatably attached to the second end of the feed lever, a second end of the feed finger is biased downward toward the top cover to engage with teeth of the saw blade.

6. The tooth setter of claim 5, wherein the feed finger comprises an adjuster to adjust a length of the feed finger.

7. The tooth setter of claim 1, wherein the second end of each plate further comprises:
    a recess in the inner face of the plate, adjacent the setting finger;
    wherein the plates are arranged such that the setting finger from the first plate opposes the recess of the second plate creating a first setting position, and the setting finger of the second plate opposes the recess of the first plate creating a second setting position.

8. The tooth setter of claim 7, wherein at least one of said first plate and said second plate comprises a finger adjuster to adjust a distance the setting finger extends outward from the inner face of the plate.

9. The tooth setter of claim 8, wherein the other of said first plate and said second plate comprises a finger adjuster to adjust the distance the setting finger extends outward from the inner face of the plate.

10. The tooth setter of claim 7, wherein at least one of said first plate and said second plate further comprises a sensor arranged in the recess that detects the setting of the tooth.

11. The tooth setter of claim 7, wherein at least one of said first plate and said second plate comprises a bend plate immediately below the recess.

12. The tooth setter of claim 7, wherein each of said first plate and said second plate comprises a sensor arranged in the recess that detects the setting of the tooth.

13. The tooth setter of claim 7, wherein each of said first plate and said second plate comprises a bend plate immediately below the recess.

14. The tooth setter of claim 1, wherein the first end of each plate comprises a follower, the follower being seated in the channel.

15. The tooth setter of claim 1, further comprising guides on the top cover that define a space therebetween to receive the saw blade, the guides are arranged on the top cover to direct the saw blade to a space between the opposing plates.

16. The tooth setter of claim 1, wherein the carriage is slidably mounted on rails.

17. The tooth setter of claim 16, wherein one end of the rails is secured to a support or to the housing, and a second end of each rail has a stop.

18. The tooth setter of claim 1, wherein the actuator is a manually operated lever.

19. The tooth setter of claim 1, wherein the actuator is driven by a motor.

* * * * *